United States Patent
Kanada et al.

(10) Patent No.: US 7,399,723 B2
(45) Date of Patent: Jul. 15, 2008

(54) DIELECTRIC CERAMIC MATERIAL

(75) Inventors: Isao Kanada, Tokyo (JP); Ryohei Nakano, Tokyo (JP); Tatsuya Kikuchi, Tokyo (JP); Hisashi Kobuke, Tokyo (JP); Masaru Abe, Tokyo (JP); Kouji Tashiro, Tokyo (JP); Matsumi Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 112 days.

(21) Appl. No.: 11/538,523

(22) Filed: Oct. 4, 2006

(65) Prior Publication Data
US 2008/0009404 A1     Jan. 10, 2008

(30) Foreign Application Priority Data
Jul. 7, 2006    (JP) ............... 2006-187318

(51) Int. Cl.
 C04B 35/457    (2006.01)
 C04B 35/462    (2006.01)
(52) U.S. Cl. ..................... 501/134
(58) Field of Classification Search ................. 501/134
 See application file for complete search history.

(56) References Cited
U.S. PATENT DOCUMENTS

| | | | |
|---|---|---|---|
| 4,665,041 A | 5/1987 | Higuchi et al. | |
| 5,132,258 A * | 7/1992 | Takahashi et al. | 501/134 |
| 5,538,928 A * | 7/1996 | Park et al. | 501/134 |
| 5,561,090 A * | 10/1996 | Park et al. | 501/134 |
| 5,700,745 A * | 12/1997 | Okuyama et al. | 501/134 |
| 5,843,860 A * | 12/1998 | Kim et al. | 501/134 |
| 6,077,802 A * | 6/2000 | Hahn et al. | 501/134 |
| 6,660,674 B2 * | 12/2003 | Iwashita et al. | 501/134 |

FOREIGN PATENT DOCUMENTS

| | | |
|---|---|---|
| JP | 55-34526 | 9/1980 |
| JP | 03-246808 | 11/1991 |
| JP | 05-6762 | 1/1993 |
| JP | 05-182524 | 7/1993 |
| JP | 07-223859 | 8/1995 |
| JP | 2001-220230 | 8/2001 |

* cited by examiner

*Primary Examiner*—Karl E Group
(74) *Attorney, Agent, or Firm*—Pearne & Gordon LLP

(57) ABSTRACT

There is provided a dielectric ceramic material in which the firing temperature dependency of the relative dielectric constant can be suppressed and the mechanical strength can be improved. Specifically, there is provided a dielectric ceramic material including: main constituents given by a composition located in the region, in a ternary diagram of $ZrO_2$, $SnO_2$ and $TiO_2$ shown in FIG. 1, bounded by point A, point B, point C, point D, point E and point F; and ZnO: 0.5 to 5 wt %, NiO: 0.1 to 3 wt %, and $SiO_2$: 0.008 to 1.5 wt % in relation to the total weight of the main constituents. The dielectric ceramic material can include $Nb_2O_5$: 0.2 wt % or less and $K_2O$: 0.035 wt % or less in relation to the total weight of the main constituents.

11 Claims, 1 Drawing Sheet

DIELECTRIC CERAMIC MATERIAL

BACKGROUND OF THE INVENTION

1. Field of the Invention

The present invention relates to a dielectric ceramic material, in particular, a dielectric ceramic material suitable for electronic components used in the high-frequency bands such as the microwave band and the millimeter wave band.

2. Description of the Related Art

The dielectric ceramic materials disclosed in Patent Documents 1 to 4 have been known as dielectric ceramic materials high in dielectric constant and high in the Q value in the high-frequency bands.

The dielectric ceramic materials disclosed in Patent Document 1 each include as the main constituents $TiO_2$: 22 to 43 wt %, $ZrO_2$: 38 to 58 wt % and $SnO_2$: 9 to 26 wt %, wherein the dielectric ceramic materials each further include ZnO in an additive amount of 7 wt % or less and NiO in an additive amount of 10 wt % or less. The main constituents are represented by a general formula $(Zr, Sn) TiO_4$. In Patent Document 1, when the content of $TiO_2$ is less than the above described range, the relative dielectric constant $\epsilon r$ is decreased, and when the content of $TiO_2$ is larger than the above described range, the temperature property of the resonance frequency becomes too large on the plus side. When the content of $ZrO_2$ is less or larger than the above described range, the temperature property of the resonance frequency becomes too large on the plus side. Further, when the content of $SnO_2$ is less than the above described range, the temperature property of the resonance frequency becomes too large on the plus side and the Q value is decreased, and when the content of $SnO_2$ is larger than the above described range, the temperature property of the resonance frequency becomes too large on the minus side. Furthermore, when the contents of ZnO and NiO are respectively larger than the above described ranges, the Q value is decreased.

For the purpose of further increasing the Q value than those of the dielectric ceramic materials disclosed in Patent Document 1, Patent Document 2 has proposed to further add 7 wt % or less of $Ta_2O_5$ to the dielectric ceramic material disclosed in Patent Document 1, and Patent Document 3 has proposed to further add 5 wt % or less of $Nb_2O_5$ to the dielectric ceramic material disclosed in Patent Document 1.

Additionally, Patent Document 4 has proposed to add 3 to 20 wt % of a glass containing at least B and Si in relation to the total weight of the main constituents disclosed in Patent Document 1, with a prerequisite that the firing temperature is as low as 1100° C. or lower, for the purpose of obtaining a dielectric ceramic material high in dielectric constant, large in the Q value and low in the temperature property of the resonance frequency.

Patent Document 1: Japanese Patent Publication No. 55-34526

Patent Document 2: Japanese Patent Publication No. 4-59267

Patent Document 3: Japanese Patent Publication No. 5-6762

Patent Document 4: Japanese Patent Laid-Open No. 2001-220230

SUMMARY OF THE INVENTION

A dielectric ceramic material is practically applied as a fired body. In general, firing is carried out at a temperature according to the composition and the desired dielectric properties. However, in an industrial production scale, the precise control of the firing temperature is extremely difficult or an attempt to precisely control the firing temperature leads to an extremely high cost to be allotted to the firing. Accordingly, the firing temperature in an actual production undergoes a certain extent of variation depending on the firing conditions and the size and performance of the furnace. Consequently, when even dielectric ceramics manufactured in one lot have a large firing temperature dependency of the dielectric properties, there are found variations between the dielectric properties of the individual dielectric ceramics depending on the extent of variation of the firing temperature. The variations between the dielectric properties are desired to be small, and it is necessary to suppress the firing temperature dependency of the relative dielectric constant $\epsilon r$, a fundamental dielectric property.

On the other hand, a dielectric ceramic material is mounted as a fired body in an electronic device, and hence is required to have a sufficient mechanical strength to cope with the handling in the course of the manufacture thereof. This strength is also required so as to cope with the mechanical stress or impact to be exerted on the electronic device after mounting of the fired body.

The present invention has been achieved on the basis of the above described technical problems, and an object of the present invention is to provide a dielectric ceramic material in which the firing temperature dependency of the relative dielectric constant $\epsilon r$ is suppressed and the mechanical strength can be improved.

By adopting the main constituents of the dielectric ceramic materials disclosed in Patent Documents 1 to 4 as the prerequisites, it has been found that silicon oxide ($SiO_2$) is effective as a material capable of attaining the suppression of the firing temperature dependency of the relative dielectric constant $\epsilon r$ and the improvement of the mechanical strength. Further, inclusion of a predetermined amount of niobium oxide ($Nb_2O_5$) has been found to be effective for the purpose of improving the mechanical strength. Furthermore, inclusion of a predetermined amount of potassium oxide ($K_2O$) has been found to be effective for the purpose of suppressing the firing temperature dependency of the relative dielectric constant $\epsilon r$.

The dielectric ceramic material of the present invention is based on the above described findings, and comprises: main constituents given by a composition located in the region, in a ternary diagram of $ZrO_2$, $SnO_2$ and $TiO_2$ shown in FIG. 1, bounded by point A ($ZrO_2$=48 mol %, $SnO_2$=12 mol %, $TiO_2$=40 mol %)

point B ($ZrO_2$=36 mol %, $SnO_2$=24 mol %, $TiO_2$=40 mol %)

point C ($ZrO_2$=30 mol %, $SnO_2$=20 mol %, $TiO_2$=50 mol %)

point D ($ZrO_2$=36 mol %, $SnO_2$=9 mol %, $TiO_2$=55 mol %)

point E ($ZrO_2$=40.5 mol %, $SnO_2$=4.5 mol %, $TiO_2$=55 mol %), and point F ($ZrO_2$=49.5 mol %, $SnO_2$=5.5 mol %, $TiO_2$=45 mol %); and ZnO: 0.5 to 5 wt %, NiO: 0.1 to 3 wt %, and $SiO_2$: 0.008 to 1.5 wt % in relation to the total weight of the main constituents.

The dielectric ceramic material of the present invention preferably includes $Nb_2O_5$: 0.2 wt % or less (not inclusive of 0) in relation to the total weight of the main constituents for the purpose of improving the strength of the composition. Additionally, the dielectric ceramic material of the present invention preferably includes $K_2O$: 0.035 wt % or less (not inclusive of 0) in relation to the total weight of the main constituents for the purpose of suppressing the firing temperature dependency of the relative dielectric constant εr.

As described above, according to the present invention, the inclusion of a predetermined amount of $SiO_2$ can suppress the firing temperature dependency of the relative dielectric constant εr. This means that dielectric ceramics stabilized in quality can be obtained in spite of the inevitable firing temperature variation in an industrial manufacturing scale. Additionally, according to the present invention, the inclusion of a predetermined amount of $SiO_2$ can improve the mechanical strength, and hence provides a resistance to the mechanical stress or impact to be exerted on the dielectric ceramic during the manufacturing process thereof or after being mounted in a product.

DETAILED DESCRIPTION OF THE PREFERRED EMBODIMENTS

Figure 1:
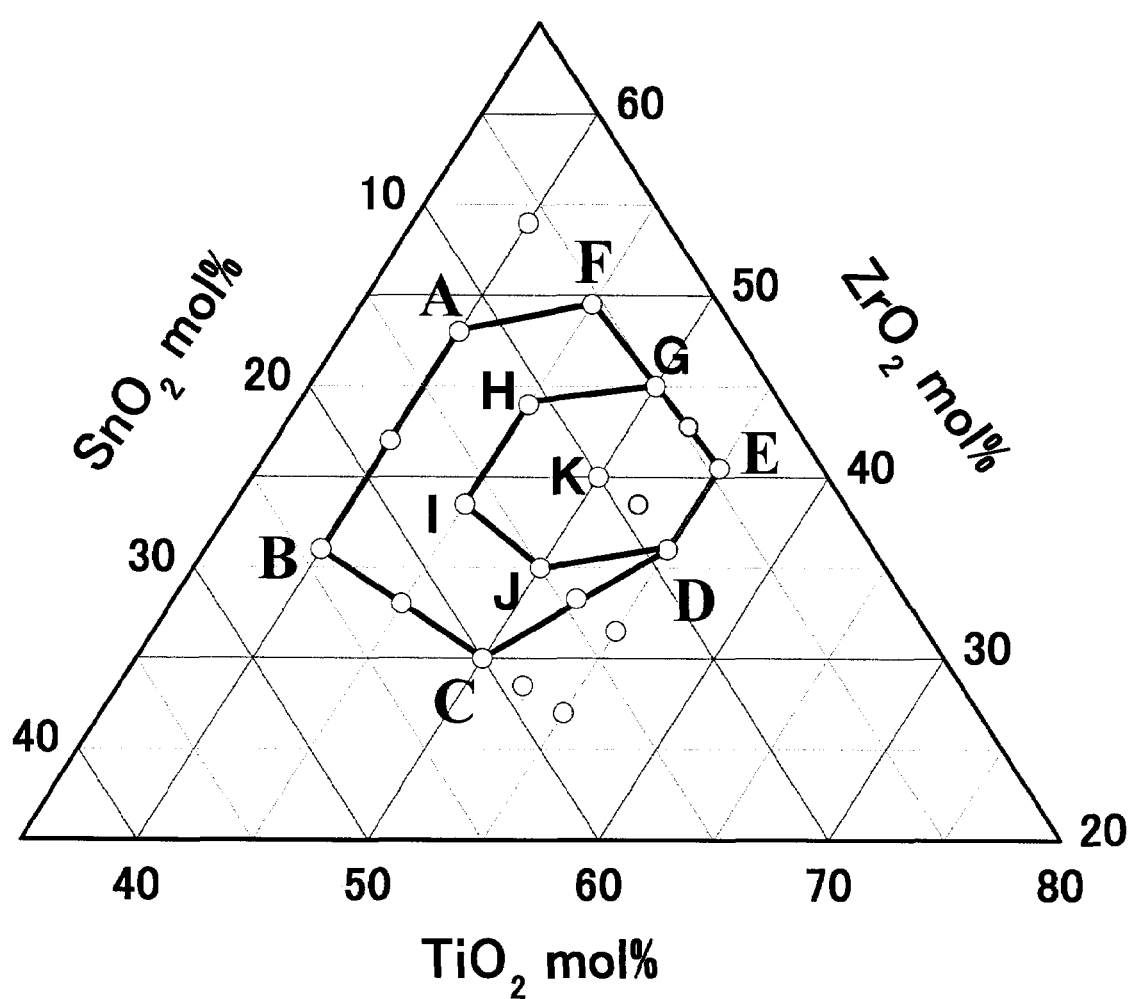
FIG. 1 is a ternary diagram that specifies the composition of the main constituents of the present invention.

Hereinafter, detailed description will be made on the dielectric ceramic material of the present invention.

First, description will be made on the main constituents.

The dielectric ceramic material of the present invention has a composition located in the region, in the ternary diagram of $ZrO_2$, $SnO_2$ and $TiO_2$ shown in FIG. 1, bounded by point A ($ZrO_2$=48 mol %, $SnO_2$=12 mol %, $TiO_2$=40 mol %)

point B ($ZrO_2$=36 mol %, $SnO_2$=24 mol %, $TiO_2$=40 mol %)

point C ($ZrO_2$=30 mol %, $SnO_2$=20 mol %, $TiO_2$=50 mol %)

point D ($ZrO_2$=36 mol %, $SnO_2$=9 mol %, $TiO_2$=55 mol %)

point E ($ZrO_2$=40.5 mol %, $SnO_2$=4.5 mol %, $TiO_2$=55 mol %), and point F ($ZrO_2$=49.5 mol %, $SnO_2$=5.5 mol %, $TiO_2$=45 mol %).

As will be shown in Example 1 to be described later, this is because by adopting this composition, there can be obtained a dielectric ceramic high both in the relative dielectric constant εr and in the Q×f value, and additionally low in the temperature property τf of the resonance frequency. By adopting this composition, the relative dielectric constant εr can be made to be 30 or more, preferably 35 or more, and more preferably 40 or more. Also by adopting this composition, the Q×f value can be made to be 40000 GHz or more, preferably 45000 GHz or more, and more preferably 50000 GHz or more. Further, by adopting this composition, the absolute value of the temperature property τf of the resonance frequency can be made to be 50 ppm/° C. or less, preferably 30 ppm/° C. or less, and more preferably 10 ppm/° C. or less. For the purpose of obtaining preferable dielectric properties, the dielectric ceramic material of the present invention preferably has a composition located in the region, in the ternary diagram of $ZrO_2$, $SnO_2$ and $TiO_2$ shown in FIG. 1, bounded by point G ($ZrO_2$=45 mol %, $SnO_2$=5 mol %, $TiO_2$=50 mol %)

point H ($ZrO_2$=44 mol %, $SnO_2$=11 mol %, $TiO_2$=45 mol %)

point I ($ZrO_2$=38.5 mol %, $SnO_2$=16.5 mol %, $TiO_2$=45 mol %)

point J ($ZrO_2$=35 mol %, $SnO_2$=15 mol %, $TiO_2$=50 mol %)

point D ($ZrO_2$=36 mol %, $SnO_2$=9 mol %, $TiO_2$=55 mol %) and point E ($ZrO_2$=40.5 mol %, $SnO_2$=4.5 mol %, $TiO_2$=55 mol %). The most preferable composition of the main constituents is a composition in the vicinity of point K ($ZrO_2$=40 mol %, $SnO_2$=10 mol %, $TiO_2$=50 mol %) in the ternary diagram of $ZrO_2$, $SnO_2$ and $TiO_2$ shown in FIG. 1.

The dielectric ceramic material of the present invention includes ZnO: 0.5 to 5 wt %, NiO: 0.1 to 3 wt %, and $SiO_2$: 0.008 to 1.5 wt % in relation to the total weight of the above described main constituent. The phrase "in relation to the total weight of the main constituents" in the present invention means that the amounts concerned are relative to the amount of the main constituents assumed to be 100 wt %.

The inclusion of ZnO can lower the firing temperature from a range of 1500 to 1700° C. down to a range of 1300 to 1400° C. to facilitate the production. However, when the content of ZnO is less than 0.5 wt %, the advantageous effect of ZnO cannot be fully attained. When the content of ZnO exceeds 5 wt %, the dielectric constant and the Q×f value are degraded. Accordingly, in the present invention, in relation to the total weight of the above described main constituents, the dielectric ceramic material is made to include ZnO: 0.5 to 5 wt %. The content of ZnO is preferably 1 to 2 wt %, more preferably 1.2 to 1.8 wt %, and furthermore preferably 1.3 to 1.7 wt %.

The inclusion of NiO can improve the Q×f value. However, when the content of NiO is less than 0.1 wt %, the advantageous effect of NiO cannot be fully attained. When the content of NiO exceeds 3 wt %, firing becomes difficult and additionally causes the degradation of the Q×f value. When NiO is not included, the color of the fired body is white, but when NiO is included in the above described range, the color of the fired body becomes green. When the density of the fired body is insufficient, the color thereof is pale, but when the fired body is sufficiently densified, the color thereof becomes deep; the change of the color significantly depends on the density, and a fired body that has been insufficiently fired for some reason can be easily identified, and thus defective articles can be easily found. When an electrode made of Ag or the like is printed on the surface of a fired body for the purpose of using it as an electronic component, it is difficult to discern the electrode and the fired body surface from each other, in a case where the fired body surface is white, by observation with an optical microscope or the like because Ag is white; the green fired body surface makes it easy to discern the electrode and the fired body surface from each other, and consequently improves the workability associated with the dimension and shape regulation of the electrode or the like to be carried out for adjustment of the electric properties. Accordingly, in the present invention, the dielectric ceramic material is made to include NiO: 0.1 to 3 wt % in relation to the total weight of the above described main constituents. The content of NiO is preferably 0.1 to 0.9 wt %, more preferably 0.2 to 0.8 wt %, and furthermore preferably 0.3 to 0.7 wt %.

In the present invention, $SiO_2$ is the most characteristic constituent, and attains the two advantageous effects, namely, the suppression effect of the firing temperature dependency of the relative dielectric constant εr and the improvement effect of the mechanical strength. Because $SiO_2$ is little contained in the main phase, $SiO_2$ can attain these effects without largely degrading the Q×f value. However, when the content of $SiO_2$ is less than 0.008 wt % or exceeds 1.5 wt %, the suppression effect of the firing temperature dependency of the relative dielectric constant εr cannot be attained. Thus, in the dielectric ceramic material of the present invention, the content of $SiO_2$ is set to be 0.008 to 1.5 wt %. The content of $SiO_2$ is preferably 0.01 to 1 wt %, more preferably 0.03 to 0.5 wt % and furthermore preferably 0.1 to 0.35 wt %.

The present invention can include $Nb_2O_5$: 0.2 wt % or less (not inclusive of 0) in relation to the total weight of the main constituents. The inclusion of $Nb_2O_5$ can further improve the mechanical strength of the dielectric ceramic. The containment of $Nb_2O_5$ in the main phase suppresses the grain growth to lead to the strength improvement. For the purpose of fully enjoying this effect, the lower limit of the content of $Nb_2O_5$ is preferably set at 0.02 wt %. The content of $Nb_2O_5$ is more preferably 0.03 to 0.1 wt %.

The present invention can include $K_2O$: 0.035 wt % or less (not inclusive of 0) in relation to the total weight of the main constituents. The inclusion of $K_2O$ can further improve the suppression effect of the firing temperature dependency of the relative dielectric constant ∈r. For the purpose of fully enjoying this effect, the lower limit of the content of $K_2O$ is preferably set at 0.001 wt %. The content of $K_2O$ is more preferably 0.002 to 0.02 wt %.

Hereinafter, description will be made on an example of a production method of the dielectric ceramic material according to the present invention.

As the raw materials for the dielectric ceramic material of the present invention, according to the above described compositions of the dielectric ceramic material according to the present invention, there are prepared starting materials for the main constituents and starting materials for the sub-constituents (ZnO, NiO, $SiO_2$, $Nb_2O_5$ and $K_2O$; hereinafter also referred to as additives) other than the main constituents.

As the starting materials constituting the main constituents, there can be used oxides of Zr, Sn and Ti ($ZrO_2$, $SnO_2$ and $TiO_2$) or compounds to be converted into these oxides by firing.

As the starting materials constituting the additives, there can be used oxides of Zn, Ni, Si, Nb and K (ZnO, NiO, $SiO_2$, $Nb_2O_5$ and $K_2O$) or compounds to be converted into these oxides by firing. Further, as the raw materials constituting the additives, there can also be used such starting materials constituting the main constituents which materials include therein Zn, Ni, Si, Nb and K.

Examples of the compounds to be converted into oxides by firing include carbonates, nitrates, oxalates and organo metallic compounds. These compounds may be used in combinations with oxides. The contents of the individual compounds in the raw materials for the dielectric ceramic material may be determined so as for these contents to give the above described composition of the dielectric ceramic material on completion of firing. The mean particle size of each of these starting material powders may be appropriately selected so as to fall approximately within a range from 0.01 to 10 µm.

These starting materials for the main constituents and the additives are weighed out according to the composition of the above described dielectric ceramic material according to the present invention, and are subjected to wet mixing with, for example, a ball mill. The slurry obtained by the wet mixing is dried and the resultant mixed powders are then subjected to a calcination to keep the mixed powders in a range, for example, from 900 to 1350° C. for a predetermined period of time. The atmosphere for this calcination may be the atmosphere of air. The retention time of the calcination may be appropriately chosen to fall within a range from 0.5 to 5.0 hours. After calcination, the calcined body is milled to a mean particle size of approximately 0.5 to 2.0 µm. For the milling, for example, a ball mill or the like is used. In advance of the milling, pulverization to a predetermined particle size may be adopted.

The milled raw material powder can be granulated for the purpose of smoothly carrying out the following compacting step. In this granulation, the milled powder may be preferably added with a small amount of an appropriate binder such as polyvinyl alcohol (PVA). The particle size of the thus obtained granules is preferably set approximately at 80 to 200 µm. The granulated powder is subjected to a press compacting at a pressure of 100 to 300 MPa, and thus, a compacted body having a desired shape can be obtained.

The binder added in advance of compacting is removed before the firing by heating and keeping the compacted body at an appropriate temperature, for example, within a range from 1250 to 1500° C. for a predetermined period of time to yield a fired body. The atmosphere for this operation may be the atmosphere of air. The heating time may be appropriately set to fall within a range from 0.5 to 5 hours. For the purpose of fully attaining the advantageous effects of the dielectric ceramic material of the present invention, it is preferable to carry out the firing within a temperature range from 1280 to 1420° C.

As described above, in an industrial production scale, the firing temperature may vary within a range from a few to a few ten degrees centigrade from location to location in the firing furnace or as a function of time. The present invention provides a dielectric ceramic material that permits stably obtaining a relative dielectric constant ∈r in spite of such variation range of the firing temperature.

By carrying out the above described steps, the dielectric ceramic material of the present invention can be obtained. The dielectric ceramic material of the present invention can attain a relative dielectric constant ∈r of 30 or more, preferably 35 or more, and more preferably 40 or more. The relative dielectric constants ∈r are given based on the reference values measured assuming that the resonance frequency being in the vicinity of 7 GHz. This is also the case for the following Q×f values and the following temperature property τf of the resonance frequency.

Additionally, the dielectric ceramic material of the present invention can attain a Q×f value of 40000 GHz or more, preferably 45000 GHz or more, and more preferably 50000 GHz or more. Here, it may be noted that the dielectric loss is a phenomenon to thermally dissipate a part of the high-frequency energy. The dielectric loss magnitude is given by Q (Q=1/tan δ), namely, the reciprocal of tan δ, wherein the loss angle tangent δ is the difference between the phase difference between the actual current and the actual voltage and the phase difference of 90 degrees between the ideal current and the ideal voltage. In the evaluation of the dielectric loss in the dielectric ceramic material of the present invention, there is used the Q×f value that is the product between this Q and the resonance frequency. When the dielectric loss becomes small, the Q×f value becomes large, and when the dielectric loss becomes large, the Q×f value becomes small. The dielectric loss means the power loss of a high-frequency device, and accordingly, it is preferable for the Q×f value of the dielectric ceramic material to be large.

Further, the dielectric ceramic material of the present invention can attain an absolute value of the temperature property τf (ppm/° C.) of the resonance frequency of 50 ppm/° C. or less, preferably 30 ppm/° C. or less and more preferably 10 ppm/° C. or less. The temperature coefficient τf of the resonance frequency can be obtained by the following formula (1). In the present invention, the following temperatures are defined: the temperatures $T_H$=85° C. and $T_L$=−40° C., and the reference temperature $T_{ref}$=20° C.

$$\tau f = [(f_{TH} - f_{TL})/f_{ref}(T_H - T_L)] \times 1000000 \text{ (ppm/° C.)} \qquad \text{Formula (1)}$$

wherein $f_{TH}$: resonance frequency (GHz) at temperature $T_H$,
$f_{TL}$: resonance frequency (GHz) at temperature $T_L$, and
$f_{ref}$: resonance frequency (GHz) at reference temperature $T_{ref}$.

Additionally, the dielectric ceramic material of the present invention can attain the suppression effect of the firing temperature dependency of the relative dielectric constant εr, and this effect can be evaluated on the basis of γεr given by the following formula (2). In the present invention, the values obtained at the temperature T1=1300° C. and the temperature T2=1400° C. are used as the reference values. The dielectric ceramic material of the present invention can attain a γεr value of less than 10%, preferably 5% or less, and more preferably 3% or less. The γεr value is obtained by carrying out the firing at a strictly controlled temperature.

$$\gamma\epsilon r=(\epsilon_{max}-\epsilon_{min})/\epsilon_{max}\times 100\ (\%) \quad \text{Formula (2)}$$

wherein $\epsilon_{max}$: the maximum value of the relative dielectric constant εr at the firing temperatures from T1 to T2, and $\epsilon_{min}$: the minimum value of the relative dielectric constant εr at the firing temperatures from T1 to T2.

EXAMPLE 1

For each of the samples shown in Table 1, a $ZrO_2$ powder, a $SnO_2$ powder and a $TiO_2$ powder were weighed out as the starting materials for the main constituents, and a ZnO powder and a NiO powder were weighted out as the starting materials for the additives according to the amounts specified in Table 1. These weighed out starting materials were mixed for dispersion with a wet ball mill, and then dried. The mixed powder thus obtained was subjected to a preliminary compacting at a pressure of 26 MPa, and calcined in air by keeping the mixed powder at 1130° C. for 2 hours. The calcined body was pulverized to 50 μm or less with a mortar and an automatic agate mortar, then milled with a wet ball mill, and dried. The mean particle size after milling was 1 to 1.5 μm.

To the milled powder thus obtained, polyvinyl alcohol was added as a binder, compacted in a cylindrical shape at a pressure of 150 MPa, and fired by keeping the compacted body in air at 1340° C. for 2 hours. This firing temperature is strictly controlled.

The thus obtained fired body having a cylindrical shape was machined in such a way that the ratio between the diameter and the height is to be approximately 2:1, the dimension and the weight of the machined fired body were measured, and the density was derived. Then, the relative dielectric constant εr, the Q×f value (GHz) and the temperature property τf (ppm/° C.) of the resonance frequency in the vicinity of 7 GHz were obtained by means of short circuiting at both ends. It is to be noted that the τf value was derived on the basis of the above described formula (1). The results obtained as described above for each of the samples are shown in Table 1.

TABLE 1

| No. | Composition | | | | | | Firing temperature ° C. | Dielectric properties | | |
|---|---|---|---|---|---|---|---|---|---|---|
| | $ZrO_2$ mol % | $SnO_2$ mol % | $TiO_2$ mol % | $SiO_2$ wt % | ZnO wt % | NiO wt % | | εr | Q × f GHz | τf ppm/° C. |
| 1* | 54 | 6 | 40 | 0.05 | 1.5 | 0.5 | 1340 | 38.0 | 33200* | 57* |
| 2(A) | 48 | 12 | 40 | 0.05 | 1.5 | 0.5 | 1340 | 35.5 | 42000 | 20 |
| 3 | 42 | 18 | 40 | 0.05 | 1.5 | 0.5 | 1340 | 33.2 | 52100 | −5 |
| 4(B) | 36 | 24 | 40 | 0.05 | 1.5 | 0.5 | 1340 | 30.0 | 60200 | −25 |
| 5(F) | 49.5 | 5.5 | 45 | 0.05 | 1.5 | 0.5 | 1340 | 39.2 | 42500 | 35 |
| 6(H) | 44 | 11 | 45 | 0.05 | 1.5 | 0.5 | 1340 | 36.4 | 51000 | 4 |
| 7(I) | 38.5 | 16.5 | 45 | 0.05 | 1.5 | 0.5 | 1340 | 33.9 | 60200 | −16 |
| 8 | 33 | 22 | 45 | 0.05 | 1.5 | 0.5 | 1340 | 32.1 | 63800 | −28 |
| 9(G) | 45 | 5 | 50 | 0.05 | 1.5 | 0.5 | 1340 | 40.1 | 48000 | 21 |
| 10(K) | 40 | 10 | 50 | 0.05 | 1.5 | 0.5 | 1340 | 37.9 | 53800 | 0 |
| 11(J) | 35 | 15 | 50 | 0.05 | 1.5 | 0.5 | 1340 | 35.9 | 61400 | −14 |
| 12(C) | 30 | 20 | 50 | 0.05 | 1.5 | 0.5 | 1340 | 36.3 | 52100 | 20 |
| 13 | 42.75 | 4.75 | 52.5 | 0.05 | 1.5 | 0.5 | 1340 | 40.5 | 48800 | 18 |
| 14 | 38 | 9.5 | 52.5 | 0.05 | 1.5 | 0.5 | 1340 | 39.2 | 52100 | 10 |
| 15 | 33.25 | 14.25 | 52.5 | 0.05 | 1.5 | 0.5 | 1340 | 38.3 | 55800 | 10 |
| 16* | 28.5 | 19 | 52.5 | 0.05 | 1.5 | 0.5 | 1340 | 39.3 | 46100 | 60* |
| 17(E) | 40.5 | 4.5 | 55 | 0.05 | 1.5 | 0.5 | 1340 | 40.2 | 48000 | 17 |
| 18(D) | 36 | 9 | 55 | 0.05 | 1.5 | 0.5 | 1340 | 40.6 | 49000 | 26 |
| 19* | 31.5 | 13.5 | 55 | 0.05 | 1.5 | 0.5 | 1340 | 41.2 | 50200 | 56* |
| 20* | 27 | 18 | 55 | 0.05 | 1.5 | 0.5 | 1340 | 42.2 | 40200 | 108* |
| 21 | 40 | 10 | 50 | 0.05 | 0.5 | 0.5 | 1340 | 38.1 | 54700 | 2 |
| 22 | 40 | 10 | 50 | 0.05 | 1.0 | 0.5 | 1340 | 38.0 | 54200 | 0 |
| 23 | 40 | 10 | 50 | 0.05 | 2.0 | 0.5 | 1340 | 37.8 | 53300 | −1 |
| 24 | 40 | 10 | 50 | 0.05 | 5.0 | 0.5 | 1340 | 37.2 | 51000 | −2 |
| 25 | 40 | 10 | 50 | 0.05 | 1.5 | 0.1 | 1340 | 38.0 | 42000 | 0 |
| 26 | 40 | 10 | 50 | 0.05 | 1.5 | 0.9 | 1340 | 37.8 | 52500 | 0 |
| 27 | 40 | 10 | 50 | 0.05 | 1.5 | 3.0 | 1340 | 37.4 | 49000 | −1 |

The dielectric ceramic material of the present invention is assumed to satisfy the prerequisite that the dielectric ceramic material has the dielectric properties (hereinafter, referred to as the reference properties) such that the relative dielectric constant εr is 30 or more, the Q×f value is 40000 GHz or more, and the absolute value of the τf value is 50 ppm/° C. or less. In Table 1, the values that do not have the reference properties are marked with "*" and the numbers for the samples associated with such values are also marked with "*"; in other words, the samples without "*" have the above described reference properties.

FIG. 1 shows a ternary diagram in which plotted are the main constituents ($ZrO_2$, $SnO_2$ and $TiO_2$) of each of the samples (Nos. 1 to 20) shown in Table 1. The alphabetical reference characters adjunct to the sample numbers in Table 1 correspond to the alphabetical characters in FIG. 1. By adopting the compositions falling within a region bounded by the polygon ABCDEF formed by connecting the plots having the reference properties, it is made possible to have the reference properties. By adopting the composition of the main constituents indicated by the plot K in FIG. 1, there can be obtained a dielectric ceramic material that is particularly low in the absolute value of τf, and excellent both in the relative dielectric constant εr and in the Q×f value. Accordingly, in the present invention, it is preferable for the composition of the main constituents to have a composition falling within the polygon GHIJDE in the ternary diagram of FIG. 1. Here, it is to be noted that the composition in the region bounded by the polygon ABCDEF means to include those compositions that lie on the line segments connecting the vertexes.

EXAMPLE 2

For each of the samples shown in Table 2, a fired body was produced in the same manner as in Example 1 except that a $ZrO_2$ powder, a $SnO_2$ powder and a $TiO_2$ powder were prepared as the starting materials for the main constituents and a ZnO powder and a NiO powder were prepared as the starting materials for the additives so as for these powders satisfy the below described compositions, and further, a $SiO_2$ powder was added as an additive in the amount specified in Table 2 and the firing was carried out at the temperature specified in Table 2. It is to be noted that the firing temperature was strictly controlled.

The main constituents: $ZrO_2$=40 mol %, $SnO_2$=10 mol %, $TiO_2$=50 mol %

The additives: ZnO=1.5 wt %, NiO=0.5 wt %, $SiO_2$=the value specified in Table 2

For each of the thus obtained fired bodies, the dielectric properties and the bending strength σ of the fired body were measured in the same manner as in Example 1, and the γεr value represented by the following formula (2) was derived from these measured values. The results thus obtained for the samples are shown in Table 2.

$$\gamma \epsilon r = (\epsilon_{max} - \epsilon_{min})/\epsilon_{max} \times 100 \ (\%) \quad \text{Formula (2)}$$

wherein $\epsilon_{max}$: the maximum value of the relative dielectric constant εr at the firing temperatures from 1300 to 1400° C., and $\epsilon_{min}$: the minimum value of the relative dielectric constant εr at the firing temperatures from 1300 to 1400° C.

TABLE 2

| Content of $SiO_2$ wt % | Firing temperature ° C. | Dielectric properties | | | | | |
|---|---|---|---|---|---|---|---|
| | | Density g/cm³ | εr | Q × f GHz | τf ppm/° C. | Bending strength σ MPa | γεr % |
| 0 | 1300 | 4.79 | 34.1 | 39000 | 1 | 100 | 10.0 |
| | 1340 | 5.12 | 37.8 | 53350 | 1 | 138 | |
| | 1370 | 5.13 | 37.9 | 53400 | 1 | 130 | |
| | 1400 | 5.13 | 37.8 | 53400 | 2 | 133 | |
| 0.009 | 1300 | 4.85 | 34.7 | 40500 | 0 | 144 | 8.8 |
| | 1340 | 5.13 | 38.0 | 53100 | 0 | 141 | |
| | 1370 | 5.13 | 38.1 | 53600 | 0 | 153 | |
| | 1400 | 5.13 | 38.0 | 53500 | 1 | 145 | |
| 0.01 | 1300 | 4.86 | 34.9 | 40800 | 0 | 140 | 8.3 |
| | 1340 | 5.13 | 38.0 | 53200 | 0 | 151 | |
| | 1370 | 5.13 | 38.1 | 53700 | 0 | 142 | |
| | 1400 | 5.13 | 37.9 | 53300 | 1 | 145 | |
| 0.015 | 1300 | 4.89 | 35.2 | 47200 | 0 | 146.5 | 7.6 |
| | 1340 | 5.13 | 38.0 | 53200 | 0 | 148 | |
| | 1370 | 5.13 | 38.0 | 53300 | 1 | 145.5 | |
| | 1400 | 5.13 | 38.0 | 53100 | 1 | 147.5 | |
| 0.02 | 1300 | 4.91 | 35.4 | 53500 | 0 | 153 | 6.8 |
| | 1340 | 5.12 | 37.9 | 53100 | 0 | 145 | |
| | 1370 | 5.13 | 38.0 | 52800 | 1 | 149 | |
| | 1400 | 5.13 | 38.0 | 52900 | 1 | 150 | |
| 0.05 | 1300 | 4.98 | 36.2 | 53400 | 0 | 158 | 4.5 |
| | 1340 | 5.12 | 37.9 | 53800 | 0 | 155 | |
| | 1370 | 5.12 | 37.8 | 53200 | 0 | 148 | |
| | 1400 | 5.12 | 37.8 | 53500 | 1 | 151 | |
| 0.2 | 1300 | 5.11 | 37.6 | 43600 | −1 | 161 | 1.2 |
| | 1340 | 5.10 | 37.5 | 49200 | −1 | 154 | |
| | 1370 | 5.08 | 37.3 | 49300 | −1 | 165 | |
| | 1400 | 5.07 | 37.1 | 49200 | −1 | 156 | |
| 0.3 | 1300 | 5.10 | 37.4 | 46450 | −2 | 163 | 2.8 |
| | 1340 | 5.10 | 37.3 | 48800 | −2 | 160 | |
| | 1370 | 5.03 | 36.6 | 48350 | −2 | 166 | |
| | 1400 | 5.01 | 36.4 | 48000 | −2 | 156 | |
| 0.4 | 1300 | 5.09 | 37.2 | 49300 | −2 | 164 | 4.4 |
| | 1340 | 5.09 | 37.2 | 48400 | −2 | 155 | |
| | 1370 | 4.98 | 35.9 | 47400 | −2 | 160 | |
| | 1400 | 4.95 | 35.6 | 46800 | −2 | 156 | |
| 0.5 | 1300 | 5.09 | 37.2 | 49200 | −2 | 167 | 4.8 |
| | 1340 | 5.09 | 37.2 | 49400 | −2 | 164 | |
| | 1370 | 4.99 | 36.0 | 47300 | −2 | 162 | |
| | 1400 | 4.94 | 35.4 | 46600 | −2 | 155 | |
| 1.5 | 1300 | 5.07 | 35.6 | 49200 | −3 | 171 | 9.3 |
| | 1340 | 4.99 | 34.8 | 49900 | −3 | 168 | |
| | 1370 | 4.87 | 33.5 | 47000 | −2 | 158 | |
| | 1400 | 4.76 | 32.3 | 40800 | −2 | 154 | |
| 2.0 | 1300 | 5.06 | 34.7 | 49200 | −7 | 165 | 13.8 |
| | 1340 | 4.96 | 33.5 | 48600 | −6 | 153 | |
| | 1370 | 4.82 | 31.9 | 44900 | −6 | 148 | |
| | 1400 | 4.64 | 29.9 | 39200 | −6 | 135 | |

As can be seen from Table 2, the inclusion of a small amount of $SiO_2$ improves the bending strength σ of the fired body. In addition, the inclusion of a small amount of $SiO_2$ can decrease the γεr value that represents the firing temperature dependency of the relative dielectric constant εr. However, when the content of $SiO_2$ exceeds 1.5 wt %, the γεr value tends to be increased and the dielectric properties also tend to be degraded. On the basis of the above described results, the dielectric ceramic material of the present invention is set to have the content of $SiO_2$ of 0.008 to 1.5 wt %. The content of $SiO_2$ is preferably 0.01 to 0.5 wt % and more preferably 0.015 to 0.3 wt % when the dielectric properties are also taken into account.

EXAMPLE 3

For each of the samples shown in Table 3, a fired body was produced in the same manner as in Example 1 except that a $ZrO_2$ powder, a $SnO_2$ powder and a $TiO_2$ powder were prepared as the starting materials for the main constituents and a ZnO powder and a NiO powder were prepared as the starting materials for the additives so as for these powders satisfy the below described compositions, and further, a $SiO_2$ powder and a $Nb_2O_5$ powder were added as additives in the amounts specified in Table 3 and the firing was carried out at the temperature specified in Table 3. It is to be noted that the firing temperature was strictly controlled.

The main constituents: $ZrO_2$=40 mol %, $SnO_2$=10 mol %, $TiO_2$=50 mol %

The additives: ZnO=1.5 wt %, NiO=0.5 wt %, $SiO_2$ and $Nb_2O_5$=the values specified in Table 3

For each of the thus obtained fired bodies, the dielectric properties and the bending strength σ of the fired body were measured in the same manner as in Example 1, and the γεr value represented by the following formula (2) was derived from these measured values. The results thus obtained for the samples are shown in Table 3.

$$\gamma \epsilon r = (\epsilon_{max} - \epsilon_{min})/\epsilon_{max} \times 100 \, (\%) \quad \text{Formula (2)}$$

wherein $\epsilon_{max}$: the maximum value of the relative dielectric constant εr at the firing temperatures from 1300 to 1400° C., and $\epsilon_{min}$: the minimum value of the relative dielectric constant εr at the firing temperatures from 1300 to 1400° C.

TABLE 3

| Content of SiO₂ wt % | Content of Nb₂O₅ wt % | Firing temperature ° C. | Density g/cm³ | εr — | Q × f GHz | τf ppm/° C. | Bending strength σ MPa | γεr % |
|---|---|---|---|---|---|---|---|---|
| — | — | 1340 | 5.12 | 37.8 | 53350 | 1 | 138 | — |
|  | 0.01 | 1340 | 5.11 | 37.8 | 53800 | 1 | 144 |  |
|  | 0.07 | 1340 | 5.12 | 37.8 | 54400 | 2 | 159 |  |
|  | 0.10 | 1370 | 5.11 | 37.6 | 54800 | 1 | 164 |  |
|  | 0.15 | 1400 | 5.10 | 37.5 | 53900 | 1 | 155 |  |
|  | 0.20 | 1400 | 5.08 | 37.1 | 51000 | 2 | 148 |  |
|  | 0.25 | 1400 | 4.95 | 35.6 | 42500 | −3 | 138 |  |
| 0.20 | 0.00 | 1300 | 5.11 | 37.6 | 43600 | −1 | 161 | 1.2 |
|  |  | 1340 | 5.10 | 37.5 | 49200 | −1 | 154 |  |
|  |  | 1370 | 5.08 | 37.3 | 49300 | −1 | 165 |  |
|  |  | 1400 | 5.07 | 37.1 | 49200 | −1 | 156 |  |
| 0.20 | 0.01 | 1300 | 5.10 | 37.2 | 49600 | −1 | 161 | 0.8 |
|  |  | 1340 | 5.10 | 37.2 | 49400 | −2 | 159 |  |
|  |  | 1370 | 5.08 | 37.0 | 49300 | −1 | 162 |  |
|  |  | 1400 | 5.07 | 36.9 | 49600 | −2 | 164 |  |
| 0.20 | 0.03 | 1300 | 5.11 | 37.4 | 46600 | −2 | 165 | 1.0 |
|  |  | 1340 | 5.10 | 37.4 | 49300 | −2 | 163 |  |
|  |  | 1370 | 5.08 | 37.1 | 49300 | −1 | 162 |  |
|  |  | 1400 | 5.07 | 37.0 | 49400 | −2 | 165 |  |
| 0.20 | 0.07 | 1300 | 5.11 | 37.6 | 43600 | −2 | 168 | 1.2 |
|  |  | 1340 | 5.10 | 37.5 | 49200 | −1 | 166 |  |
|  |  | 1370 | 5.08 | 37.3 | 49300 | −1 | 162 |  |
|  |  | 1400 | 5.07 | 37.1 | 49200 | −1 | 165 |  |
| 0.20 | 0.10 | 1300 | 5.09 | 37.3 | 46350 | −2 | 171 | 1.0 |
|  |  | 1340 | 5.09 | 37.3 | 50000 | −1 | 179 |  |
|  |  | 1370 | 5.07 | 37.1 | 50500 | −1 | 165 |  |
|  |  | 1400 | 5.06 | 37.0 | 50600 | −1 | 177 |  |
| 0.20 | 0.15 | 1300 | 5.06 | 37.0 | 49100 | −2 | 166 | 0.9 |
|  |  | 1340 | 5.08 | 37.1 | 50853 | −2 | 168 |  |
|  |  | 1370 | 5.06 | 37.0 | 51725 | −1 | 158 |  |
|  |  | 1400 | 5.04 | 36.8 | 51900 | −1 | 162 |  |
| 0.20 | 0.20 | 1300 | 5.05 | 36.3 | 48900 | −2 | 212 | 1.1 |
|  |  | 1340 | 5.05 | 36.2 | 49200 | −1 | 181 |  |
|  |  | 1370 | 5.04 | 36.1 | 49100 | −1 | 169 |  |
|  |  | 1400 | 5.02 | 35.9 | 48800 | −2 | 175 |  |
| 0.01 | — | 1300 | 4.86 | 34.9 | 40800 | 0 | 140 | 8.3 |
|  |  | 1340 | 5.13 | 38.0 | 53200 | 0 | 151 |  |
|  |  | 1370 | 5.13 | 38.1 | 53700 | 0 | 142 |  |
|  |  | 1400 | 5.13 | 37.9 | 53300 | 1 | 145 |  |
| 0.01 | 0.20 | 1300 | 4.79 | 33.8 | 40600 | 1 | 172 | 8.9 |
|  |  | 1340 | 4.98 | 36.0 | 46300 | 1 | 185 |  |
|  |  | 1370 | 5.03 | 36.5 | 48800 | 2 | 174 |  |
|  |  | 1400 | 5.08 | 37.1 | 50000 | 2 | 179 |  |
| 0.05 | 0.20 | 1300 | 4.92 | 35.7 | 42000 | 0 | 193 | 4.8 |
|  |  | 1340 | 5.08 | 37.3 | 49200 | 0 | 161 |  |
|  |  | 1370 | 5.10 | 37.5 | 49000 | 1 | 169 |  |
|  |  | 1400 | 5.10 | 37.5 | 50100 | 1 | 175 |  |
| 0.1 | 0.20 | 1300 | 5.05 | 36.9 | 44000 | −1 | 182 | 1.3 |
|  |  | 1340 | 5.08 | 37.4 | 49200 | 0 | 174 |  |
|  |  | 1370 | 5.07 | 37.3 | 49800 | 0 | 181 |  |
|  |  | 1400 | 5.06 | 37.1 | 49800 | 0 | 170 |  |
| 0.5 | 0.20 | 1280 | 5.04 | 36.4 | 48100 | −3 | 204 | 3.8 |
|  |  | 1340 | 5.02 | 36.2 | 51000 | −2 | 176 |  |
|  |  | 1370 | 4.95 | 35.5 | 49600 | −2 | 174 |  |
|  |  | 1400 | 4.90 | 35.0 | 49200 | −2 | 181 |  |
| 1.0 | 0.20 | 1300 | 5.03 | 36.1 | 48900 | −4 | 199 | 6.6 |
|  |  | 1340 | 5.03 | 36.0 | 51800 | −4 | 205 |  |
|  |  | 1370 | 4.91 | 34.5 | 51000 | −3 | 174 |  |
|  |  | 1400 | 4.84 | 33.7 | 49800 | −3 | 177 |  |
| 1.5 | 0.20 | 1300 | 5.02 | 35.8 | 47900 | −7 | 210 | 8.4 |
|  |  | 1340 | 5.01 | 35.7 | 51500 | −7 | 200 |  |
|  |  | 1370 | 4.88 | 34.2 | 50300 | −6 | 185 |  |
|  |  | 1400 | 4.75 | 32.8 | 48500 | −6 | 165 |  |

As can be seen from Table 3, the inclusion of $Nb_2O_5$ can improve the bending strength σ. However, even when the content of $Nb_2O_5$ is increased, the bending strength improvement effect tends to be saturated and the firing temperature dependency of the relative dielectric constant εr tends to become large. Accordingly, the content of $Nb_2O_5$ is set at 0.2 wt % or less. The content of $Nb_2O_5$ is preferably 0.03 to 0.1 wt % when the bending strength improvement effect and the firing temperature dependency of the relative dielectric constant εr are taken into account.

EXAMPLE 4

For each of the samples shown in Table 4, a fired body was produced in the same manner as in Example 1 except that a ZrO₂ powder, a SnO₂ powder and a TiO₂ powder were prepared as the starting materials for the main constituents and a ZnO powder and a NiO powder were prepared as the starting materials for the additives so as for these powders satisfy the below described compositions, and further, a SiO₂ powder, a Nb₂O₅ powder and a K₂CO₃ powder were added as additives in the amounts specified in Table 4 (the amount of the K₂CO₃ powder is given in terms of the oxide (K₂O)) and the firing was carried out at the temperature specified in Table 4. It is to be noted that the firing temperature was strictly controlled.

The main constituents: $ZrO_2$=40 mol %, $SnO_2$=10 mol %, $TiO_2$=50 mol %

The additives: ZnO=1.5 wt %, NiO=0.5 wt %, SiO₂, Nb₂O₅ and K₂O powders=the values specified in Table 4

For each of the thus obtained fired bodies, the dielectric properties and the bending strength σ of the fired body were measured in the same manner as in Example 1, and the γεr value represented by the following formula (2) was derived from these measured values. The results thus obtained for the samples are shown in Table 4.

$$\gamma\epsilon r(\epsilon_{max}-\epsilon_{min})/\epsilon_{max}\times 100\ (\%) \quad \text{Formula (2)}$$

wherein $\epsilon_{max}$: the maximum value of the relative dielectric constant εr at the firing temperatures from 1300 to 1400° C., and $\epsilon_{min}$: the minimum value of the relative dielectric constant εr at the firing temperatures from 1300 to 1400° C.

TABLE 4

| SiO₂ wt % | Nb₂O₅ wt % | K₂O wt % | Firing temperature ° C. | Density g/cm³ | εr — | Q × f GHz | τf ppm/° C. | Bending strength σ MPa | γεr % |
|---|---|---|---|---|---|---|---|---|---|
| 0.1 | 0.2 | 0 | 1300 | 5.05 | 36.9 | 44000 | −1 | 182 | 1.3 |
|  |  |  | 1340 | 5.08 | 37.4 | 49200 | 0 | 174 |  |
|  |  |  | 1370 | 5.07 | 37.3 | 49800 | 0 | 181 |  |
|  |  |  | 1400 | 5.06 | 37.1 | 49800 | 0 | 170 |  |
| 0.1 | 0.2 | 0.0008 | 1300 | 5.06 | 37.1 | 45700 | −1 | 182 | 1.2 |
|  |  |  | 1340 | 5.09 | 37.5 | 49700 | 0 | 174 |  |
|  |  |  | 1370 | 5.08 | 37.3 | 49900 | −1 | 175 |  |
|  |  |  | 1400 | 5.07 | 37.2 | 49900 | 0 | 169 |  |
| 0.1 | 0.2 | 0.001 | 1300 | 5.06 | 37.2 | 47400 | −1 | 181 | 1.1 |
|  |  |  | 1340 | 5.09 | 37.6 | 50100 | 0 | 173 |  |
|  |  |  | 1370 | 5.08 | 37.4 | 50000 | −1 | 175 |  |
|  |  |  | 1400 | 5.07 | 37.3 | 50000 | 0 | 168 |  |
| 0.1 | 0.2 | 0.005 | 1300 | 5.09 | 37.6 | 49800 | 0 | 171 | 1.1 |
|  |  |  | 1340 | 5.10 | 37.9 | 50500 | −1 | 165 |  |
|  |  |  | 1370 | 5.10 | 37.8 | 50700 | 0 | 172 |  |
|  |  |  | 1400 | 5.08 | 37.5 | 49900 | 0 | 175 |  |
| 0.1 | 0.2 | 0.01 | 1300 | 5.11 | 38.0 | 49700 | 0 | 169 | 0.9 |
|  |  |  | 1340 | 5.11 | 38.0 | 49200 | −1 | 178 |  |
|  |  |  | 1370 | 5.10 | 37.8 | 49300 | −1 | 191 |  |
|  |  |  | 1400 | 5.09 | 37.7 | 49200 | 0 | 168 |  |
| 0.1 | 0.2 | 0.02 | 1300 | 5.12 | 38.1 | 49800 | −1 | 181 | 0.8 |
|  |  |  | 1340 | 5.12 | 38.1 | 46300 | −1 | 183 |  |
|  |  |  | 1370 | 5.11 | 37.9 | 47500 | −1 | 174 |  |
|  |  |  | 1400 | 5.10 | 37.7 | 45400 | 0 | 167 |  |
| 0.1 | 0.2 | 0.035 | 1300 | 5.12 | 38.1 | 49800 | −1 | 192 | 0.8 |
|  |  |  | 1340 | 5.12 | 38.1 | 43300 | 0 | 188 |  |
|  |  |  | 1370 | 5.11 | 38.0 | 45600 | 0 | 176 |  |
|  |  |  | 1400 | 5.10 | 37.8 | 41500 | 0 | 165 |  |
| 0.1 | 0.2 | 0.05 | 1300 | 5.13 | 38.3 | 15500 | −1 | 135 | 0.8 |
|  |  |  | 1340 | 5.13 | 38.2 | 18500 | 0 | 138 |  |
|  |  |  | 1370 | 5.12 | 38.1 | 20500 | 0 | 148 |  |
|  |  |  | 1400 | 5.11 | 38.0 | 21700 | 0 | 130 |  |

As can be seen from Table 4, the inclusion of K₂O can suppress the firing temperature dependency of the relative dielectric constant εr. However, excessive inclusion of K₂O causes the degradation of the dielectric properties, in particular, the degradation of the Q×f value, and accordingly, in the present invention, the content of K₂O is set at 0.035 wt % or less.

What is claimed is:

1. A dielectric ceramic material comprising:
   main constituents given by a composition located in a region, in a ternary diagram of ZrO₂, SnO₂ and TiO₂ shown in FIG. 1, bounded by
   point A (ZrO₂=48 mol %, SnO₂=12 mol %, TiO₂=40 mol %)
   point B (ZrO₂=36 mol %, SnO₂=24 mol %, TiO₂=40 mol %)
   point C (ZrO₂=30 mol %, SnO₂=20 mol %, TiO₂=50 mol %)
   point D (ZrO₂=36 mol %, SnO₂=9 mol %, TiO₂=55 mol %)

point E ($ZrO_2$=40.5 mol %, $SnO_2$=4.5 mol %, $TiO_2$=55 mol %), and
point F ($ZrO_2$=49.5 mol %, $SnO_2$=5.5 mol %, $TiO_2$=45 mol %); and
ZnO: 0.5 to 5 wt %,
NiO: 0.1 to 3 wt %, and
$SiO_2$: 0.008 to 1.5 wt % in relation to the total weight of said main constituents.

2. A dielectric ceramic material comprising:
main constituents given by a composition located in a region, in a ternary diagram of $ZrO_2$, $SnO_2$ and $TiO_2$ shown in FIG. 1, bounded by
point G ($ZrO_2$=45 mol %, $SnO_2$=5 mol %, $TiO_2$=50 mol %)
point H ($ZrO_2$=44 mol %, $SnO_2$=11 mol %, $TiO_2$=45 mol %)
point I ($ZrO_2$=38.5 mol %, $SnO_2$=16.5 mol %, $TiO_2$=45 mol %)
point J ($ZrO_2$=35 mol %, $SnO_2$=15 mol %, $TiO_2$=50 mol %)
point D ($ZrO_2$=36 mol %, $SnO_2$=9 mol %, $TiO_2$=55 mol %), and
point E ($ZrO_2$=40.5 mol %, $SnO_2$=4.5 mol %, $TiO_2$=55 mol %); and
ZnO: 0.5 to 5 wt %,
NiO: 0.1 to 3 wt %, and
$SiO_2$: 0.008 to 1.5 wt % in relation to the total weight of said main constituents.

3. The dielectric ceramic material according to claim 1 or 2, further comprising $Nb_2O_5$: 0.2 wt % or less (not inclusive of 0) in relation to the total weight of saidmain constituents.

4. The dielectric ceramic material according to claim 1 or 2, further comprising $K_2O$: 0.035 wt % or less (not inclusive of 0) in relation to the total weight of saidmain constituents.

5. The dielectric ceramic material according to claim 1 or 2, comprising ZnO: 1 to 2 wt % in relation to the total weight of said main constituents.

6. The dielectric ceramic material according to claim 1 or 2, comprising NiO: 0.1 to 0.9 wt % in relation to the total weight of said main constituents.

7. The dielectric ceramic material according to claim 1 or 2, comprising $SiO_2$: 0.01 to 1 wt % in relation to the total weight of said main constituents.

8. The dielectric ceramic material according to claim 1 or 2, further comprising $Nb_2O_5$: 0.03 to 0.1 wt % in relation to the total weight of said main constituents.

9. The dielectric ceramic material according to claim 1 or 2, further comprising $K_2O$: 0.002 to 0.02 wt % in relation to the total weight of said main constituents.

10. The dielectric ceramic material according to claim 1 or 2, comprising
ZnO: 1 to 2 wt %,
NiO: 0.1 to 0.9 wt %,
$SiO_2$: 0.01 to 1 wt %, and
$Nb_2O_5$: 0.03 to 0.1 wt % in relation to the total weight of said main constituents.

11. The dielectric ceramic material according to claim 10, further comprising $K_2O$: 0.002 to 0.02 wt % in relation to the total weight of said main constituents.

* * * * *